United States Patent [19]
Schlichting

[11] Patent Number: 5,366,537
[45] Date of Patent: Nov. 22, 1994

[54] FUEL AND OXYGEN ADDITION FOR METAL SMELTING OR REFINING PROCESS

[75] Inventor: Mark R. Schlichting, Chesterton, Ind.

[73] Assignee: Steel Technology Corporation, Washington, D.C.

[21] Appl. No.: 722

[22] Filed: Jan. 5, 1993

[51] Int. Cl.⁵ ............................................. C22B 15/00
[52] U.S. Cl. ...................................... 75/528; 266/225
[58] Field of Search ............................ 266/225; 75/528

[56] References Cited

U.S. PATENT DOCUMENTS

| | | | |
|---|---|---|---|
| 2,991,173 | 7/1961 | Trentini | 75/550 |
| 4,434,005 | 2/1984 | Metz | 75/60 |
| 4,533,124 | 8/1985 | Mercatoris | 266/225 |
| 4,639,269 | 1/1987 | Hilbrans | 266/225 |

*Primary Examiner*—Peter D. Rosenberg
*Attorney, Agent, or Firm*—Fitzpatrick, Cella, Harper & Scinto

[57] ABSTRACT

A furnace 10 for smelting iron ore and/or refining molten iron 20 is equipped with an overhead pneumatic lance 40, through which a center stream of particulate coal 53 is ejected at high velocity into a slag layer 30. An annular stream of nitrogen or argon 51 enshrouds the coal stream. Oxygen 52 is simultaneously ejected in an annular stream encircling the inert gas stream 51. The interposition of the inert gas stream between the coal and oxygen streams prevents the volatile matter in the coal from combusting before it reaches the slag layer. Heat of combustion is thus more efficiently delivered to the slag, where it is needed to sustain the desired reactions occurring there. A second stream of lower velocity oxygen can be delivered through an outermost annulus 84 to react with carbon monoxide gas rising from slag layer 30, thereby adding still more heat to the furnace.

34 Claims, 5 Drawing Sheets

FUEL AND OXYGEN ADDITION FOR METAL SMELTING OR REFINING PROCESS

The Government of the United States of America has rights in this invention pursuant to Cooperative Agreement No. DE-FC07-89ID12847 awarded by the U.S. Department of Energy.

FIELD OF THE INVENTION

This invention concerns a process and an apparatus for introducing oxygen and a carbonaceous fuel into a smelting and/or metal refining furnace. In particular, the invention concerns the introduction of oxygen and carbonaceous fuel into the furnace through a lance in such a manner that the volatile matter content of the fuel is combusted in a fashion permitting optimum utilization of the heat of combustion in the smelting or refining operation.

DESCRIPTION OF THE PRIOR ART

It is known that a pneumatic lance device may be used to introduce oxygen and solid materials into a furnace for refining molten metals. The lance may be used to introduce oxygen alone or to introduce both oxygen and solid fuel concurrently. This is common in the refining of ferrous materials such as iron melts to produce steel.

During a typical iron refining process, oxygen alone is delivered to the iron melt, utilizing a pneumatic lance, in order to partially oxidize the carbon in the melt, thereby reducing the carbon content of the iron. The incompletely oxidized carbon rises and escapes from the melt as carbon monoxide. Additional heat of combustion is available if the carbon monoxide is further oxidized to carbon dioxide before the CO escapes from the furnace. It is known to utilize a second stream of oxygen above the melt to oxidize the CO in the vicinity immediately above the melt, thereby capturing the energy released by this reaction.

Typically, in the refining of molten iron, quantities of steel scrap are added to the process. In order to prevent cooling and solidification of the molten bath from the addition of the scrap, it is known to add quantities of solid fuel, commonly carbonaceous material, to the process to create heat. This has been accomplished by utilizing a lance to deliver both oxygen and carbonaceous material to the melt. The carbonaceous material is injected into the molten bath to recarburize the melt, and oxygen is simultaneously injected into the molten bath. The oxidation of the additional carbon and the subsequent secondary oxidation of the resulting carbon monoxide result in the release of sufficient additional energy to maintain the temperature of the melt and to melt the cold scrap additions.

Top-blowing systems have been described for introducing both solid fuel and oxygen to the melt of a metal refining operation. Metz et al., U.S. Pat. No. 4,434,005, issued Feb. 28, 1984, describe a method of introducing carbon and oxygen into the melt of a refining operation by means of a blowing device. Mercatoris, U.S. Pat. No. 4,533,124, issued Aug. 6, 1985, uses a blowing apparatus containing a chamber filled with inert gas to separate the oxygen and the solid material during transport through the apparatus. With these devices and methods, the carbon and the oxygen are not separated after they exit the blowing apparatus. This can lead to premature combustion of the fuel, unless the fuel and oxygen are injected into the melt at very high velocities. Moreover, these devices and methods do not permit the utilization of the carbon or the oxygen for processes or reactions that may be desired in a slag layer on top of the melt. Further, volatile matter in the carbon may be permitted to escape before reaching a location where it can be combusted and the heat of combustion utilized.

SUMMARY OF THE INVENTION

The present invention is a process for combusting carbonaceous material and oxygen in a smelting and/or refining operation, and an apparatus for delivering the carbonaceous material and oxygen to the furnace in which the operation is being performed, that have certain advantages over the prior art processes and apparatus. In the process, the carbonaceous material and the oxygen are introduced from overhead in the form of nearby streams, and a stream of inert gas is interposed between the carbonaceous material and the oxygen streams, thereby preventing commingling of the fuel and oxygen during transport. By keeping the carbonaceous material and oxygen separated, premature combustion of the carbonaceous material can be prevented, without having to use such high stream velocities that the carbonaceous material is propelled deep into the melt. By using the lower injection velocity, the carbonaceous material can be made available for smelting reactions such as reducing iron ore to elemental iron, using the carbonaceous material as a reducing agent, or other types of reactions that are desired within the slag layer. By separating the carbonaceous material and oxygen until the carbonaceous material stream is well within the slag layer, but not through it, that is, not reaching the underlying melt, combustible volatile matter in the carbonaceous material can be made to combust in the slag layer, so that the heat of that combustion is better utilized to sustain the reactions occurring in the slag layer and/or the melt.

Carbonaceous material used as fuel generally contains combustible volatile matter. For example, coal used in the reduction of iron ore may contain volatile matter such as hydrogen, which is utilized as a fuel source to generate the necessary heat for the reaction. Examples of other suitable sources of carbonaceous material are coke, graphite, char, and hydrocarbon gases or liquids, (e.g., petroleum products). The carbonaceous material is propelled toward the slag layer with sufficient velocity to prevent substantial devolatilization until the carbonaceous material has penetrated the slag layer. Concurrently, oxygen is also propelled toward the slag layer, and the carbonaceous material and oxygen streams are kept separate during transport to the slag layer by means of the inert gas stream interposed between the oxygen and the carbonaceous material, thus preventing premature oxidation or combustion of the carbonaceous material. By "inert gas" is here meant a gas that, under the conditions of the process, is essentially nonreactive with both the carbonaceous material and the oxygen. Examples of suitable inert gases include nitrogen, argon, carbon dioxide, steam, and off-gas combustion products.

The velocities of the carbonaceous material stream and the oxygen stream, and the distance of separation of the two streams are preferably selected so that the volatile matter in the carbonaceous material is combusted at some point below the surface of the slag layer, but above the surface of the melt. Usually the velocity of each stream will be about Mach 0.75 or higher. As a result of the combustion in the slag layer, at least a portion of the energy released as heat of combustion of the volatile matter is utilized by the smelting or refining operation in the slag layer.

In one embodiment of the invention, the carbonaceous material is introduced in a center stream which is shrouded by the inert gas stream and is thereby separated from the oxygen, which is introduced in the form of at least one outer stream.

A preferred embodiment of the invention utilizes the process in the combined smelting of iron ore and refining of molten iron utilizing particulate coal as the carbonaceous material and argon or nitrogen as the inert gas. The coal is preferably delivered in a stream at a speed of between about Mach 0.75 and about Mach 2, surrounded by the nitrogen or argon stream delivered at about Mach 0.5 to Mach 1.5, and the oxygen outer stream is preferably delivered at a speed of about Mach 0.75 to Mach 2.0. The three streams are injected into a slag layer which is a minimum of about 0.5 meter in thickness, the slag layer resting on top of the molten iron bath.

An especially preferred embodiment of the invention uses a lance to deliver the three streams, with the protective inert gas stream being an annular stream (i.e., in the form of a hollow cylinder) having a thickness of about 0.75 to 3.0 millimeters at the point where it exits the lance. The coal and the inert gas are kept separate during the transport to the slag and until the coal has penetrated deep within the slag layer. It is an objective of this process to prevent the volatile matter of the coal from escaping to the furnace atmosphere. It is a further object to combust the volatile matter and to thereby utilize the heat of combustion of the volatile matter to advance the desired chemical reaction or reactions occurring in the slag layer and/or the melt.

Another aspect of the invention concerns a pneumatic lance for delivering the carbonaceous material and oxygen to a furnace in which reactants are heated, in such a manner that the two streams are separated by an inert gas stream, thereby delaying contact of the carbonaceous material and oxygen streams. The lance comprises a central core surrounded by a first annular opening through which the inert gas is ejected and a second annular opening surrounding the first annular opening. Either the oxygen or carbonaceous material can be propelled through the central core and the other through the second annular opening. The central core can be constructed, or example, of pipe having a wall thickness of about 4 to 7 millimeters. Preferably, the carbonaceous material is ejected from the central core, while the oxygen is ejected from the second annular opening at an angle of about 10 to 45 degrees, more preferably about 15 to 20 degrees, from the axis of the carbonaceous material stream. It is preferred that the diameter of the central core be about 20 to 40 millimeters, more preferably about 20 to 30 millimeters; that the width of the first annular opening be about 0.75 to 3 millimeters, more preferably about 0.75 to 1.25, or even 0.9 to 1.1, millimeters; and that the width of the second annular opening be about 19 to 50 millimeters, more preferably about 19 to 25 millimeters.

The lance preferably is comprised of an elongated body member containing inlet and discharge ends for the carbonaceous material, inert gas and oxygen streams. It is preferred that the flow of the carbonaceous material be through the central core, surrounded by the simultaneous flow of the inert gas through the first annular chamber, and the simultaneous flow of the oxygen through the second annular chamber. However, it is possible for the flow of the oxygen to be directed through the central core and the flow of the carbonaceous material to be directed through the second annular chamber. The lance incorporates means for delivering the carbonaceous material to the, inlet end of the central core or the second annular chamber, means for delivering the inert gas to the inlet end of the first annular chamber and means for delivering the oxygen to the inlet end of the central core or the second annular chamber, whichever is not connected to the carbonaceous material feed line.

Preferably the lance is equipped with a detachable injection nozzle for the discharge ends of the tubular core, the first annular chamber, and the second annular chamber. The nozzle preferably has a central opening that is of the same approximate size as, and is lined up with, the central core, a ring-shaped opening that is of the same approximate size as, and is lined up with, the first annular opening, and a series of about 6 to 16 dispenser openings lined up with the second annular opening, the openings preferably having a total cross-sectional area of at least about 1,000 square millimeters. The dispenser openings can be cylindrical bores evenly spaced around the second annular opening, each at an angle of about 10 to 45 degrees outward from the central core's axis. The bores have sufficient length to impart direction to the flow of the material, preferably oxygen, being discharged from the second annular opening. It is preferred that the central core be constructed of a removable pipe to permit changing of the core in the event of solids plugging. The nozzle may be designed so that the discharge speed of each of the three streams is subsonic or supersonic.

The lance may optionally be equipped with a third annular chamber surrounding the second annular chamber, the third chamber also having inlet and discharge ends. In this embodiment the lance includes means for delivering oxygen to the third chamber, and preferably it includes means for directing the oxygen flowing out of the third chamber in an outward direction at an angle of about 10 to 30 or 35 degrees from the direction of flow of the other stream of oxygen as it leaves the lance. By use of this version of the lance, a primary stream (or "hard blow") of oxygen can be ejected through the second annulus at a velocity sufficient to penetrate the slag layer to combust incompletely therein volatile matter from the carbonaceous material, while a secondary stream (or "soft blow") of oxygen can be ejected through the third annulus. Carbon monoxide formed from the incomplete combustion in the slag rises, and the secondary oxygen stream provides combustion above or just below the surface of the slag of at least a portion of the released carbon monoxide, thus supplying additional heat to the process. The velocity of the secondary oxygen stream will often be from about Mach 0.70 or 0.75 to about Mach 1.8.

These and other features, aspects, and advantages of the present invention will become better understood with reference to the following description, appended claims, and drawings.

DETAILED DESCRIPTION AND PREFERRED EMBODIMENT OF THE INVENTION

Figure 1:
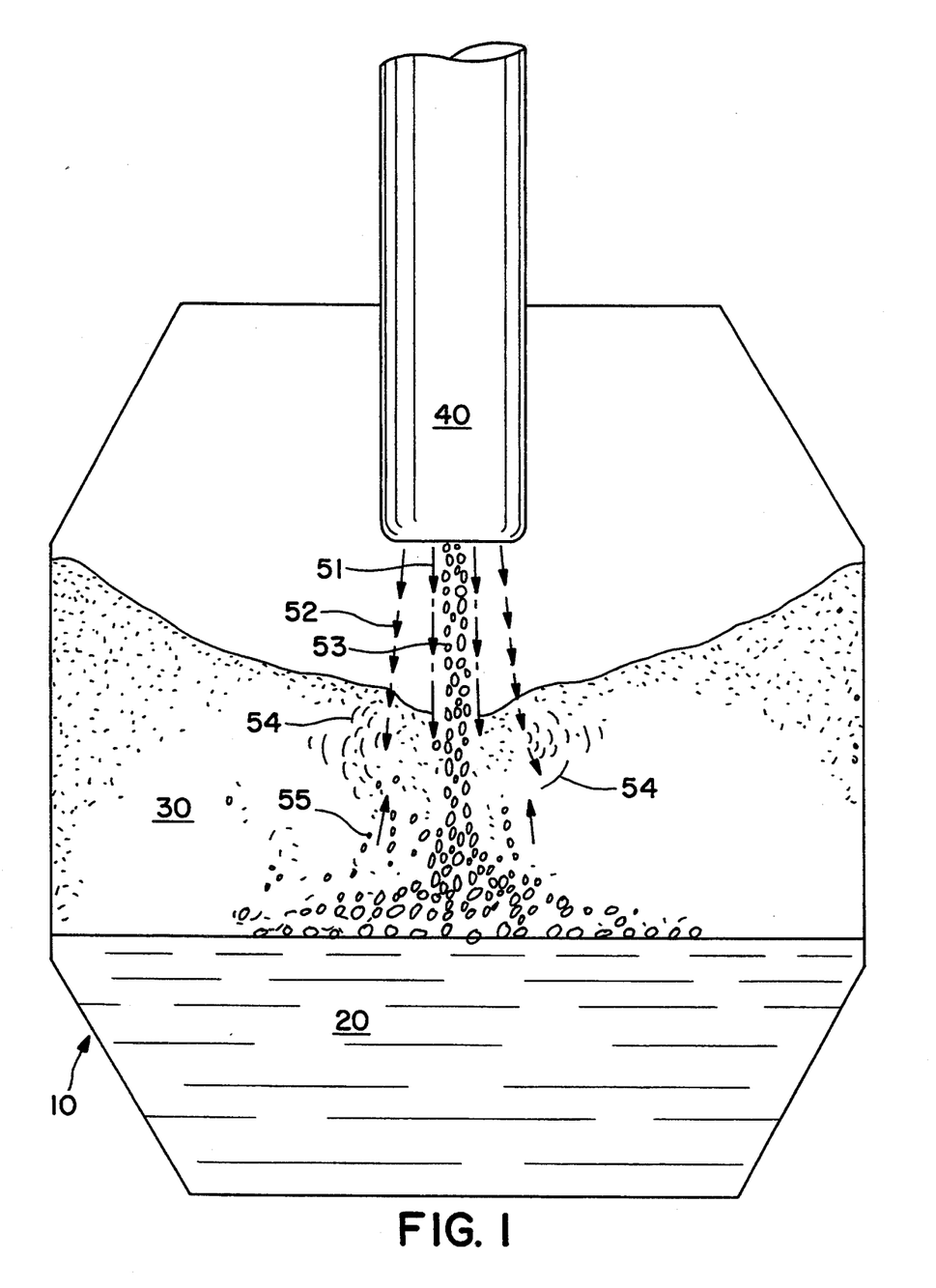
FIG. 1 is a diagram illustrating one embodiment of the process of the invention.

Referring to FIG. 1 of the drawings, a general schematic section of a furnace 10 in which the process of the invention is to occur is shown. This can be any of a number of types of furnaces commonly known to those skilled in the art and used for the refining or smelting of metals and their ores. In the preferred embodiment depicted in FIG. 1, iron ore is being reduced to iron and the resulting iron is being refined.

As shown schematically in FIG. 1, in furnace 10 molten iron 20 is being refined and iron ore is being reduced. A molten foamy slag layer 30 containing the iron ore is resting on the molten iron. Particulate coal 53, containing volatile matter, is propelled toward slag layer 30 as the central stream of a pneumatic lance 40, while oxygen 52 is introduced in the form of an outer annular stream from the lance. The coal 53 and oxygen 52 are kept separate after they exit the lance by means of an annular stream of nitrogen 51. The coal 53 is discharged from the lance at a speed of about Mach 0.75 to Mach 1.2. The oxygen 52 is discharged from the lance at a speed of about Mach 0.5 to Mach 1.5. The nitrogen 51 is discharged from the lance at a speed of about Mach 0.75 to Mach 1.2.

The coal 53, oxygen 52, and nitrogen 51 are injected into the foamy slag layer 30 resting on top of the molten iron 20. The thickness of the slag layer is maintained at least about 0.5 meter, preferably at least about 1.0 meter.

To maintain the separation of the carbon 53 and oxygen 52, the thickness of the annular nitrogen stream 51 is maintained at about 0.7 to 1.2 millimeters, at the point where it exits lance 40.

The slag layer 30 thickness, the velocities of the coal 53, oxygen 52, and nitrogen 51, and the thickness of the annular nitrogen shroud 51, are maintained so that at least a portion of the volatile matter in the coal remains in the coal stream until it has penetrated into the slag layer. Similarly, contact between a substantial portion of the coal 53 and the oxygen 52 is delayed until the coal 53 has penetrated into the slag layer. As a result, the volatile matter 55 separates from the coal at some point in the slag layer 30 and begins to rise. It is intercepted by the oxygen stream 52 and is combusted before reaching the surface of the slag layer 30. The resulting energy, as heat of combustion 54 of the volatile matter, is available to the reaction or reactions occurring in the slag layer 30, or for use in maintaining the temperature of the overall process.

Figure 2A:
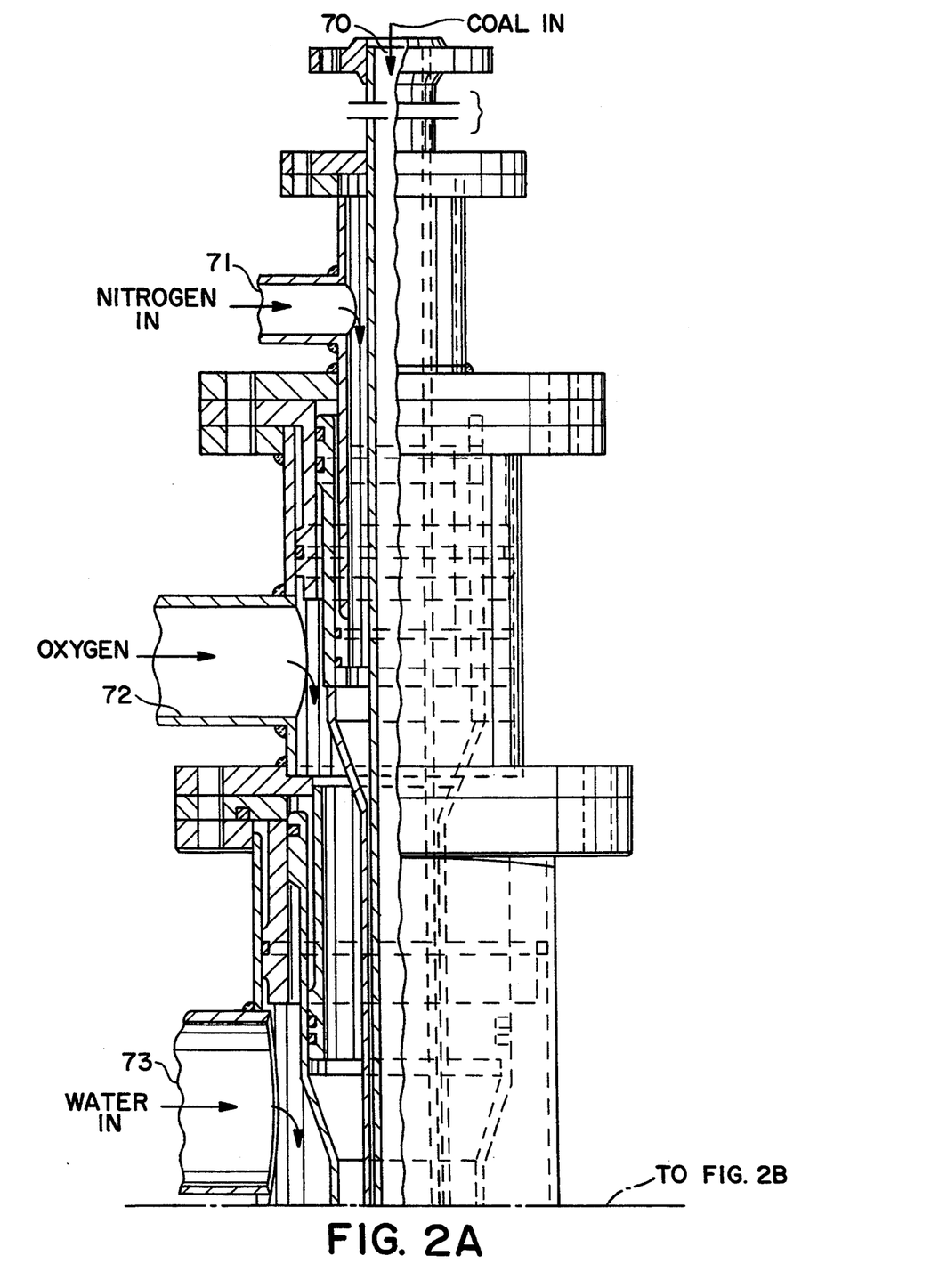
FIG. 2A is a longitudinal axial section of the inlet portion of a lance embodying features of the present invention.
Figure 2B:
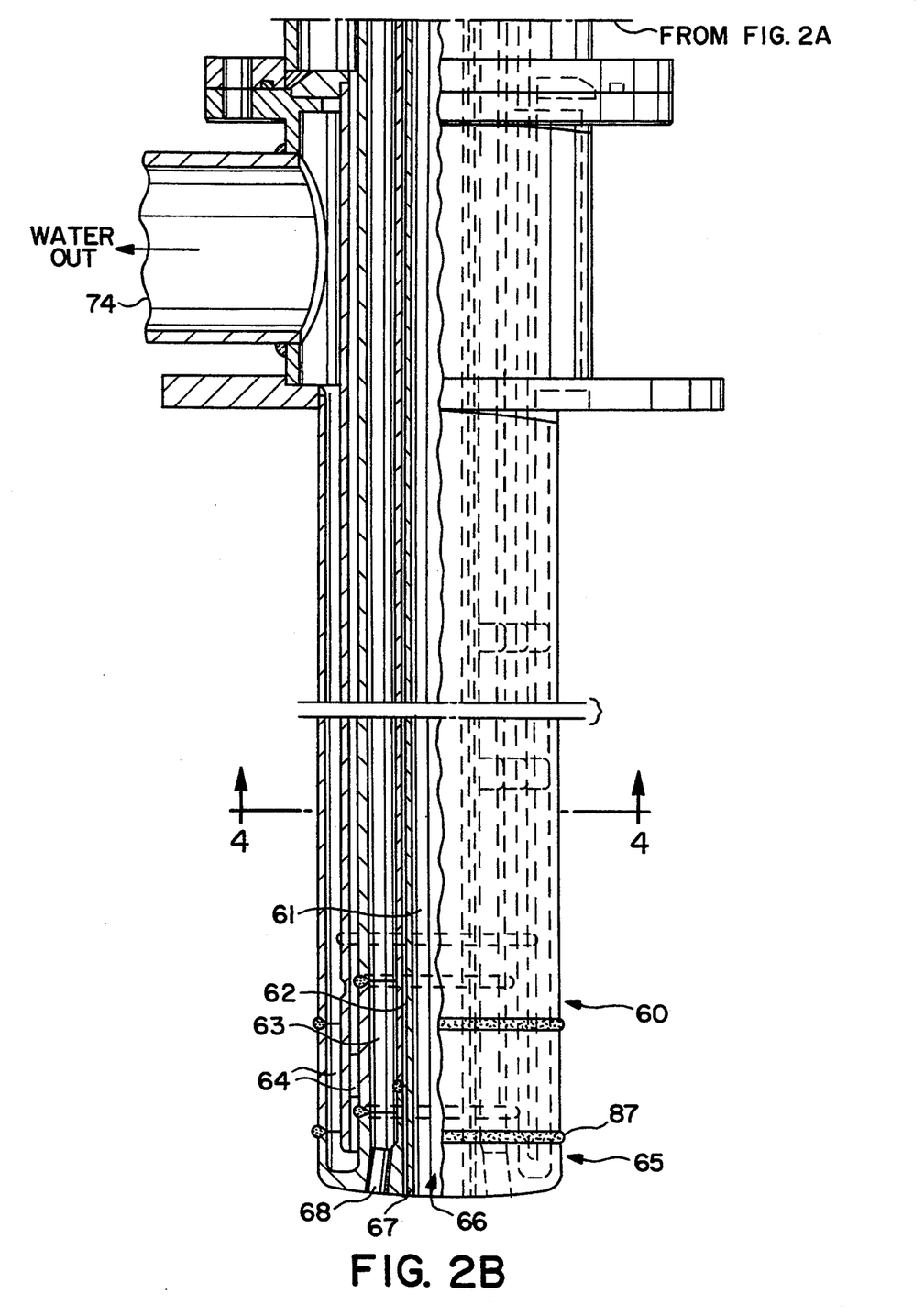
FIG. 2B is a longitudinal axial section of the discharge portion of the lance depicted in FIG. 2A.
Figure 3:
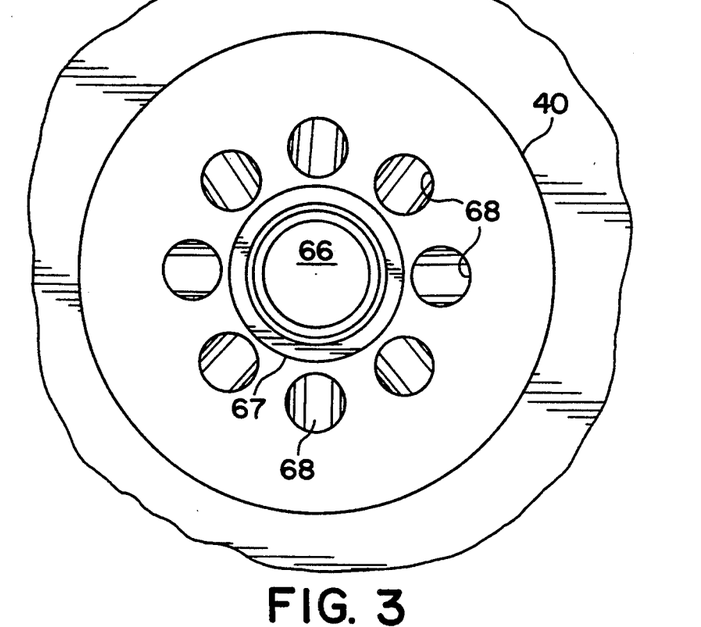
FIG. 3 is an end view of the nozzle end of the lance of FIGS. 2A and B.
Figure 4:
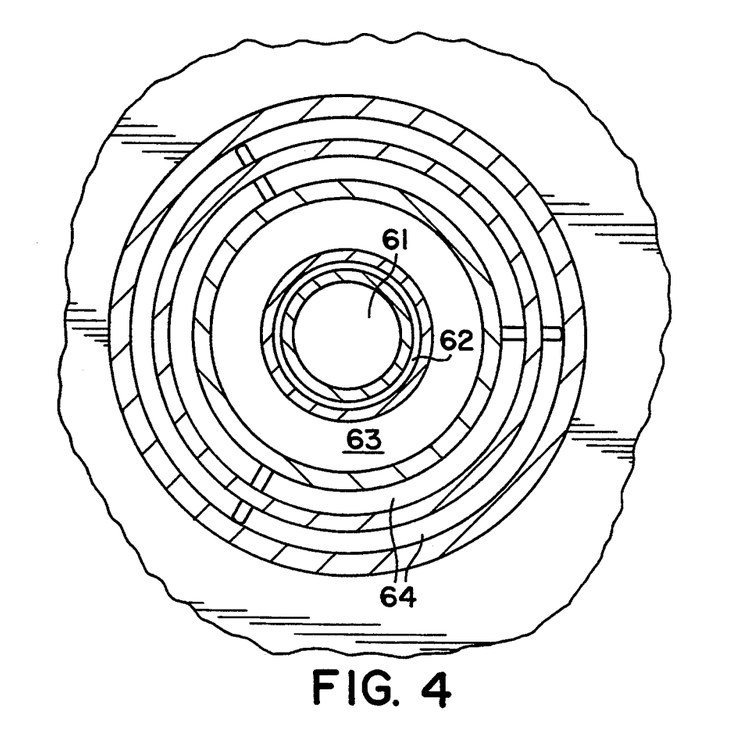
FIG. 4 is a cross-sectional view of the body of the lance of FIGS. 2A and B.

Referring now to FIGS. 2, 3, and 4, lance 60 is designed to be used to deliver the carbonaceous material, oxygen, and inert gas to the slag layer. The lance consists of an elongated body with a central core 61, which is surrounded by a first annular chamber 62 and a second annular chamber 63. The central core 61 is used for the delivery of the carbonaceous material and the second annular chamber 63 is used to deliver the oxygen. The oxygen stream is delivered at an angle of about 15 to 20 degrees from the axis of the carbonaceous material stream. The first annular chamber 62 is used to deliver the inert gas, which serves to separate the carbonaceous material and oxygen during transport through the lance.

The central core 61 is tubular and can be made of steel pipe with an inside diameter of about 25 to 30 millimeters, and a wall thickness of about 4 to 7 millimeters. The central tubular core 61 is made removable, permitting the tube to be changed in the event of solids plugging. The width of the first annular chamber 62 is about 0.9 to 1.1 millimeters. The second annular chamber 63 is about 19 to 25 millimeters in width. The spatial arrangements of the chambers can be viewed in FIG. 4, which is a cross-sectional view of the elongated body taken along the line 4—4 in FIG. 2B. The lance 60 is provided with a water cooling chamber 64 surrounding the second annular opening 63.

The lance 60 incorporates inlet means for the carbonaceous material, the oxygen, the inert gas, and the water. In the preferred embodiment shown in FIG. 2, the coal inlet means 70 is to the central core, the nitrogen inlet means 71 is to the first annular chamber, the oxygen inlet means 72 is to the second annular chamber, and the water inlet means 73 is to the enclosed chamber 64 surrounding the second annular chamber. Water cooling chamber 64 is equipped with a water discharge means 74.

The discharge ends of the tubular central core 61, the first annular chamber 62, and the second annular chamber 63 are located in a detachable and replaceable nozzle 65. The nozzle is welded to the lance body 60. It can be replaced by cutting radially through the lance 60 at or slightly above the weld 87 and then welding the new nozzle to the resulting cut end of the lance.

An end view of the nozzle is shown in FIG. 3. In this arrangement, the nozzle contains a central opening 66 that corresponds with and communicates with the central tubular core 61. A ring-shaped opening 67 corresponds with and communicates with the first annular chamber 62. The discharge of the contents of the second annular chamber 63 is to a series of dispenser openings 68 that communicate with the second annular chamber 63. These dispenser openings 68, numbering about 8, are evenly spaced around the second annular chamber 63 and provide a total open area of at least about 1000 square millimeters. Preferably, the dispenser openings 68 are cylindrical bores through the nozzle with sufficient length to provide direction to the flow of oxygen from the openings. More preferably, the cylindrical bores serving as the dispenser openings 68 are about 32 to 65 millimeters in length and have an axis that is angled from about 15 to 20 degrees outwardly from the core's axis. They have diameters of about 15 to 17 millimeters.

Figure 5:
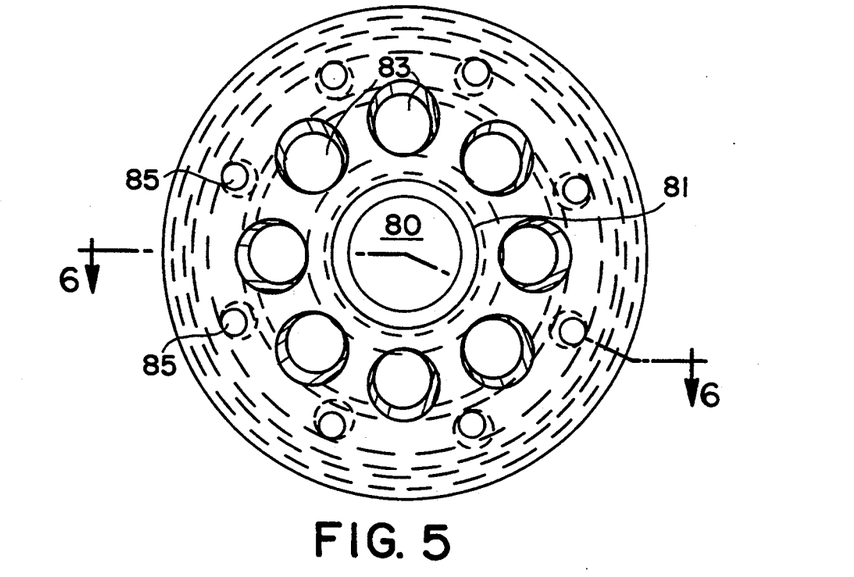
FIG. 5 is a longitudinal axial section of the discharge portion of another version of a lance embodying features of the present invention.
Figure 6:
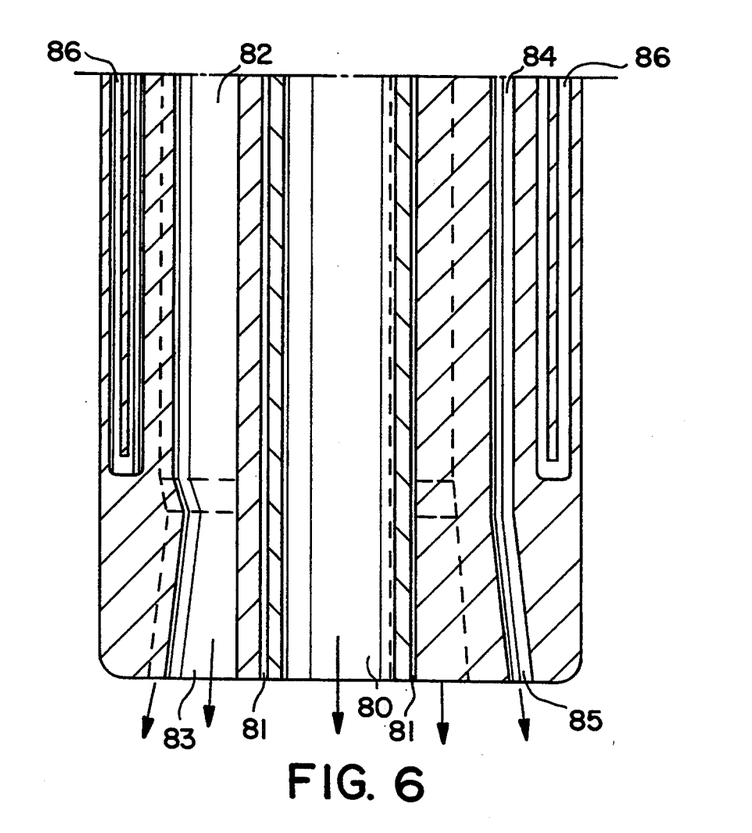
FIG. 6 is an end view of the nozzle end of the lance of FIG. 5.

In FIGS. 5 and 6 is depicted the replaceable tip of a modified version of the lance of FIGS. 2–4, designed to permit the simultaneous introduction of both hard blow and soft blow oxygen, together with the particulate coal. The coal is delivered through central passage 80, for example at a velocity of about Mach 0.75 to 2.0. A thin shroud of inert gas, preferably nitrogen or argon, is forced out of annular chamber 81, for example at a velocity of about Mach 0.5 to 1.5. A hard blow of oxygen, for example having a velocity of about Mach 0.75 to about 1.8 or 2.0, is discharged from annular chamber 82. Dispenser holes 83 angle the hard blow oxygen away from the center axis by about 15 degrees. Soft blow oxygen, for example at a velocity of about Mach 0.5 to 1.0, is delivered through annular chamber 84. Dispenser openings 85 direct the secondary oxygen outwardly from the hard blow oxygen at an angle of about 25 degrees (measured from the direction of flow of the hard blow oxygen). Cooling water is circulated through U-shaped annular chamber 86, for example at a flow rate of about 150 to 180 $NM^3$/hr.

The lance may be poised above the surface of the slag layer a distance of, say, about 0.20 to 0.50 meters, measured from the bottom tip. The higher velocity oxygen ejected through nozzles 83 primarily serves to penetrate into the slag layer, in which it then reacts with volatile matter released from the coal. The lower velocity oxygen ejected through nozzles 85 serves primarily to react with carbon monoxide gas rising from the slag. Generally, more soft blow oxygen is needed than hard blow; e.g., the volume ratio of soft to hard will be in the range of about 1/1 to 1.2/1. The ratio of the total area of nozzle openings for the hard blow oxygen to the total area of nozzle openings for the soft blow oxygen may, for example, be within the range of about 1/1 to 0.9/1.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. An improved smelting or refining process in which a carbonaceous material is used as a fuel source or reducing agent or both in a furnace in which is contained a molten metal layer having an upper surface upon which rests a slag layer having an upper surface, the process including the steps of introducing a stream of the carbonaceous material and a stream of oxygen to the furnace from a location above the upper surface of the slag layer, the improvement comprising the step of interposing a stream of an inert gas between the stream of carbonaceous material and the stream of oxygen.

2. The process of claim 1, wherein the molten metal layer comprises iron.

3. The process of claim 2, wherein iron ore is being reduced.

4. The process of claim 3, wherein the carbonaceous material contains combustible volatile matter; wherein the stream of carbonaceous material is introduced into the slag layer with a velocity sufficient that the stream of carbonaceous material and at least a portion of the combustible volatile matter reach and penetrate into the slag layer; and wherein the stream of oxygen is introduced at a velocity sufficient to reach and penetrate into the slag layer.

5. The process of claim 4, wherein the stream of oxygen penetrates into the slag layer to a depth the same as or less than that of the stream of carbonaceous material.

6. The process of claim 5, wherein the velocity of the stream of carbonaceous material, the velocity of the stream of oxygen, the velocity of the stream of inert gas, and the distance separating the stream of oxygen from the stream of carbonaceous material are selected so that the combustible volatile matter combusts at a point below the upper surface of the slag layer, but above the upper surface of the molten metal layer, through contact of the oxygen with the combustible volatile matter, thereby releasing a heat of combustion to the process within the slag layer.

7. The process of claim 6, wherein the stream of carbonaceous material is a center stream, wherein the stream of oxygen comprises at least one outer stream, and wherein the stream of inert gas shrouds the stream of carbonaceous material, thereby separating the stream of carbonaceous material from the stream of oxygen.

8. The process of claim 7, wherein the carbonaceous material is selected from the group consisting of coal, coke, graphite, char, and hydrocarbon gases or liquids.

9. The process of claim 7, wherein the carbonaceous material is particulate coal.

10. The process of claim 8, wherein the inert gas is selected from the group consisting of nitrogen, argon, carbon dioxide, steam, and off-gas combustion products.

11. The process of claim 9, wherein the inert gas is argon.

12. The process of claim 9, wherein the inert gas is nitrogen.

13. The process of claim 10, wherein the velocity of the stream of carbonaceous material is about Mach 0.75 to about Mach 2, the velocity of the stream of inert gas is about Mach 0.5 to about Mach 1.5, and the velocity of the stream of oxygen is about Mach 0.75 to about Mach 2.

14. The process of claim 13, wherein the vertical thickness of the slag layer is at least about 0.5 meter.

15. The process of claim 14, wherein the streams of carbonaceous material, oxygen and inert gas are introduced by a lance, and the stream of inert gas is an annular stream having a thickness of about 0.75 to about 3 mm. at the point where it exits the lance.

16. The process of claim 1, wherein the carbonaceous material contains combustible volatile matter; wherein the stream of carbonaceous material is introduced into the slag layer with a velocity sufficient that the stream of carbonaceous material and at least a portion of the combustible volatile matter reach and penetrate into the slag layer; and wherein the stream of oxygen is introduced at a velocity sufficient to reach and penetrate into the slag layer.

17. The process of claim 16, wherein the stream of oxygen penetrates into the slag layer to a depth the same as or less than that of the stream of carbonaceous material.

18. The process of claim 17, wherein the velocity of the stream of carbonaceous material, the velocity of the stream of oxygen, the velocity of the stream of inert gas, and the distance separating the stream of oxygen from the stream of carbonaceous material are selected so that the combustible volatile matter combusts at a point below the upper surface of the slag layer, but above the upper surface of the molten metal layer, through contact of the oxygen with the combustible volatile matter, thereby releasing a heat of combustion to the process.

19. The process of claim 18, wherein the stream of carbonaceous material is a center stream, wherein the stream of oxygen comprises at least one outer stream, and wherein the stream of inert gas shrouds the stream of carbonaceous material, thereby separating the stream of carbonaceous material from the stream of oxygen.

20. The process of claim 19, wherein the carbonaceous material is selected from the group consisting of coal, coke, graphite, char, and hydrocarbon gases or liquids.

21. The process of claim 20, wherein the inert gas is selected from the group consisting of nitrogen, argon, carbon dioxide, steam, and off-gas combustion products.

22. The process of claim 21, wherein the streams of carbonaceous material, oxygen and inert gas are introduced by a lance, and the stream of inert gas is an annular stream having a thickness of about 1 to 3 mm. at the point where it exits the lance.

23. The process of claim 1, wherein the carbonaceous material is selected from the group consisting of coal, coke, graphite, char, and hydrocarbon gases or liquids.

24. The process of claim 1, wherein the inert gas is selected from the group consisting of nitrogen, argon, carbon dioxide, steam, and off-gas combustion products.

25. The process of claim 16, wherein the stream of oxygen includes a first stream and a second stream; wherein the first oxygen stream penetrates the slag layer to combust incompletely therein the combustible volatile matter in the carbonaceous material, thereby forming carbon monoxide which rises from the slag layer; and wherein the second oxygen stream provides combustion of at least a portion of said carbon monoxide.

26. The process of claim 25, wherein the stream of carbonaceous material is a center stream, wherein the first and second oxygen streams are introduced outside the stream of carbonaceous material, and wherein the stream of inert gas shrouds the stream of carbonaceous material, thereby separating the stream of carbonaceous material from the first and second oxygen streams.

27. The process of claim 26, wherein the first oxygen stream is discharged at an angle of about 15 to 25 degrees outwardly from an axis of the center stream, and the second oxygen stream is discharged at an angle of about 10 to 35 degrees outwardly from a direction of flow of the first oxygen stream.

28. The process of claim 25, wherein the velocity of the stream of carbonaceous material is about Mach 0.75 to about Mach 2, the velocity of the stream of inert gas is about Mach 0.5 to about Mach 1.5, the velocity of the first oxygen stream is about Mach 0.75 to about Mach 2, and the velocity of the second oxygen stream is about Mach 0.75 to about Mach 1.8.

29. The process of claim 28, wherein the streams of carbonaceous material, oxygen and inert gas are introduced by a lance, and the stream of inert gas is an annular stream having a thickness of about 0.75 to 3 mm. at the point where it exits the lance.

30. The process of claim 29, wherein iron ore is being reduced; wherein the carbonaceous material is selected from the group consisting of coal, coke, graphite, char, and hydrocarbon gases or liquids; and wherein the inert gas is argon or nitrogen.

31. The process of claim 1, wherein the carbonaceous material contains combustible volatile matter, and wherein the velocity of the stream of the carbonaceous material, the velocity of the stream of oxygen, the velocity of the stream of inert gas and the distance separating the stream of oxygen and the stream of carbonaceous material are selected so that the combustible volatile matter of the carbonaceous material combusts at a point below the upper surface of the slag layer, but above the upper surface of the molten metal layer, through contact of the oxygen with the combustible volatile matter, thereby releasing heat of combustion to the process.

32. The process of claim 1, wherein the carbonaceous material is particulate coal.

33. The process of claim 1, wherein the inert gas is nitrogen.

34. An improved iron ore smelting process in which coal containing combustible volatile matter is used as a fuel source and reducing agent in a furnace in which is contained an iron melt having an upper surface upon which rests a molten foamy slag layer having an upper surface, the process comprising the step of introducing the coal and oxygen to the furnace from a location above the upper surface of the slag layer, the improvement comprising a combination of the steps of:
  a) introducing a stream of the coal and a stream of oxygen by means of a lance, and separating the coal and oxygen during transport through the lance and during transfer from the lance to the slag layer by interposing an annular stream of nitrogen gas between the coal and the oxygen;
  b) supplying the coal to the process through central core of the lance;
  c) supplying the nitrogen gas to the process through a first annular chamber of the lance surrounding the central core;
  d) supplying the oxygen to the process through a second annular chamber of the lance;
  e) supplying the stream of coal at a velocity of about Mach 0.75 to about Mach 1.25 sufficient that at least a portion of the combustible volatile matter remains with the coal until the coal is injected into the slag layer;
  f) supplying the stream of nitrogen gas at a velocity of about Mach 0.75 to about Mach 1.25, the thickness of the annular nitrogen gas stream at the point where it exits the lance being about 0.75 to about 1.25 mm., thereby delaying contact of at least a portion of the combustible volatile matter with the oxygen until the coal and oxygen have been injected into the slag layer;
  g) providing a slag layer having a minimum thickness of at least about 1 meter; and
  h) combusting at least a portion of the combustible volatile matter within the slag layer, thereby releasing a heat of combustion to the process.

* * * * *

UNITED STATES PATENT AND TRADEMARK OFFICE
CERTIFICATE OF CORRECTION

PATENT NO. : 5,366,537
DATED : November 22, 1994
INVENTOR(S) : MARK R. SCHLICHTING It is certified that error appears in the above-indentified patent and that said Letters Patent is hereby corrected as shown below:

<u>COLUMN 3</u>

Line 49, "or example" should read --for example--.

<u>COLUMN 4</u>

Line 7, delete ",".

Signed and Sealed this

Eighth Day of August, 1995

Attest:

BRUCE LEHMAN

Attesting Officer        Commissioner of Patents and Trademarks